United States Patent
Santi et al.

(10) Patent No.: US 12,524,637 B2
(45) Date of Patent: Jan. 13, 2026

(54) SYSTEM AND METHOD FOR SYMBOL DETECTION

(71) Applicant: DATALOGIC USA, INC., Eugene, OR (US)

(72) Inventors: Stefano Santi, Eugene, OR (US); Thomas Prihoda, Portland, OR (US)

(73) Assignee: DATALOGIC IP TECH S.R.L., Bologna (IT)

(*) Notice: Subject to any disclaimer, the term of this patent is extended or adjusted under 35 U.S.C. 154(b) by 0 days.

(21) Appl. No.: 18/746,961

(22) Filed: Jun. 18, 2024

(65) Prior Publication Data

US 2025/0384232 A1   Dec. 18, 2025

(51) Int. Cl.
| | |
|---|---|
| *G06K 7/14* | (2006.01) |
| *G06T 5/20* | (2006.01) |
| *G06T 7/11* | (2017.01) |
| *G06V 10/44* | (2022.01) |
| *G06V 10/771* | (2022.01) |

(52) U.S. Cl.
CPC .............. *G06K 7/1443* (2013.01); *G06T 5/20* (2013.01); *G06T 7/11* (2017.01); *G06V 10/44* (2022.01); *G06V 10/771* (2022.01); *G06T 2207/20084* (2013.01)

(58) Field of Classification Search
CPC ........... G06K 7/1443; G06T 5/20; G06T 7/11; G06T 2207/20084; G06V 10/44; G06V 10/771
See application file for complete search history.

(56) References Cited

U.S. PATENT DOCUMENTS

| | | | |
|---|---|---|---|
| 10,078,774 B1 | 9/2018 | Vorabbi et al. | |
| 11,902,561 B2* | 2/2024 | Wang | G06N 3/045 |
| 11,954,819 B1* | 4/2024 | Pattichis | G06T 1/60 |
| 2017/0351936 A1 | 12/2017 | Jiang | |
| 2018/0247405 A1* | 8/2018 | Kisilev | G06T 7/0012 |
| 2019/0065799 A1 | 2/2019 | Santi et al. | |
| 2021/0329286 A1* | 10/2021 | Wang | G06N 3/045 |

(Continued)

FOREIGN PATENT DOCUMENTS

| | | | | |
|---|---|---|---|---|
| CA | 3157863 A1 * | 5/2021 | | G01J 3/463 |
| CN | 107392224 A * | 11/2017 | | G06K 9/4652 |

(Continued)

OTHER PUBLICATIONS

CN107392224A—Crop disease recognition algorithm based on three-channel convolutional neural network, 5 pages. (Year: 2025).*

(Continued)

*Primary Examiner* — Tuyen K Vo
(74) *Attorney, Agent, or Firm* — Cozen O'Connor

(57) ABSTRACT

An optical symbol detector has an input operative to receive a captured image frame. The detector includes a feature extractor engine coupled to the input to produce a downscaled descriptor map based on the captured image frame, the descriptor map including a convolutional map of blocks of the captured image frame. The detector further includes a coarse estimator engine coupled to an output of the feature extractor engine to produce a detection indication and localization information of an optical pattern indicative of a machine-readable symbol based on the downscaled descriptor map.

19 Claims, 11 Drawing Sheets

(56) References Cited

U.S. PATENT DOCUMENTS

| | | | |
|---|---|---|---|
| 2022/0121871 A1* | 4/2022 | Peng | G06N 3/08 |
| 2022/0270207 A1* | 8/2022 | Chen | G06T 3/4046 |
| 2022/0375546 A1* | 11/2022 | Huang | G06V 10/82 |
| 2023/0043716 A1* | 2/2023 | Hotson | G06F 18/22 |

FOREIGN PATENT DOCUMENTS

| | | | | |
|---|---|---|---|---|
| CN | 110427793 A | * | 11/2019 | G06K 7/1408 |
| CN | 115270841 A | * | 11/2022 | |
| EP | 0851374 | | 7/1998 | |

OTHER PUBLICATIONS

CN115270841A—Bar code detection method, device, storage medium and computer device, 23 pages. (Year: 2025).*

CN110427793A Bar code detection method and system based on deep learning, 7 pages. (Year: 2025).*

A. Gupta, et al., "Synthetic Data for Text Localisation in Natural Images," IEEE Conference on Computer Vision and Pattern Recognition. 2016.

A. Shrivastava, et al. "Learning from Simulated and Unsupervised Images through Adversarial Training,", 2016.

L. Sixt, et al. "RENDERGAN: Generating Realistic Labeled Data,", 2016.

J. Redmond, et al. "YOLO9000: Better, Faster, Stronger". 2016.

X. Wang et al., "Wisdom of Committees: an Overlooked Approach to Faster and More Accurate Models", 2020.

EP Search Report mailed Aug. 7, 2025 in EP App No. 25183177.2 15 pages.

Ouenum Jerome et al: "Fast, Accurate Barcode Detection in Ultra High-Resolution Images", 2021 IEEE International Conference on Image Processing (ICIP), IEEE, Sep. 19, 2021 (Sep. 19, 2021), pp. 1019-1023, XP034122527, DOI: 10.1109/ICIP42928.2021. 9506134 [retrieved on Aug. 23, 2021].

Zharkov Andrey et al: "Universal Barcode Detector via Semantic Segmentation", 2019 International Conference on Document Analysis and Recongition (ICDAR), IEEE, Sep. 20, 2019 (Sep. 20, 2019), pp. 837-843, XP033701293, DOI: 10.1109/ICDAR.2019.00139.

Extended EP Search Report mailed Nov. 12, 2025 in EP App No., 25183177.2 15 pages.

Yani Ioannou et al: "Decision Forests, 1-15 Convolutional Networks and the Models in-Between", Arxiv.org, Cornell University Library, 201 Olin Library Cornell University Ithaca, NY 14853, Mar. 3, 2016 (Mar. 3, 2016), XP080687094.

* cited by examiner

SYSTEM AND METHOD FOR SYMBOL DETECTION

TECHNICAL FIELD

The present disclosure generally relates to machine vision and, more particularly, to detecting machine-readable symbols such as 2D patterns.

BACKGROUND

Symbol-reading technology has evolved from linear readers, such as laser barcode scanners, to 2D imagers, which capture image frames and perform processing to detect and decode any symbols present in the captured images. 2D imagers offer a number of advantages, including the ability to read different types of symbols, including traditional barcodes, 2D symbols (e.g., Maxicode, QR, Aztec, Datamatrix), printed strings of one or more characters or numerals, handwriting, or the like.

In practical applications, especially for reading 2D symbols printed on, or affixed to, fast-moving objects such as objects being conveyed in manufacturing, transportation or logistics operations (as in package-sorting scenarios), several key challenges stand out. For one, imagers need to rapidly identify and focus on barcodes within a constantly moving frame, a task complicated by varying backgrounds and lighting conditions. Also, the system must accurately differentiate real barcodes from similar high-contrast patterns to avoid false detections. Furthermore, processing latency is critical: the time from image capture to barcode decoding must be minimal to detect, localize, and read a symbol during the short time that the symbol is within the field of view of the image capture device. Similar challenges present themselves in handheld reader applications, where users expect consistent and fast responsiveness to scanning activations.

Moreover, as image sensor technology continues to evolve with increasing resolution and data rates, these challenges are further exacerbated. Sensors with greater resolution produce larger images with greater pixel counts and, at the same time, they capture a higher number of images per unit of time. Processing larger images in the same amount of time as smaller ones takes greater computational power, which adds cost and energy demand for the processing platform.

Solutions are needed to address these, and related, challenges in low-latency 2D symbol reading systems.

SUMMARY

In some aspects, the techniques described herein relate to an optical symbol detector, including: an input operative to receive a captured image frame; a feature extractor engine coupled to the input to produce a downscaled descriptor map based on the captured image frame, the descriptor map including a convolutional map of blocks of the captured image frame; and a coarse estimator engine coupled to an output of the feature extractor engine to produce a detection indication and localization information of an optical pattern indicative of a machine-readable symbol based on the downscaled descriptor map.

In related aspects, the techniques described herein relate to a method for operating an optical symbol detector, including: receiving a captured image frame; autonomously computationally producing a downscaled descriptor map based on the captured image frame, the descriptor map including a convolutional map of blocks of the captured image frame; and autonomously computationally producing a detection indication and localization information of an optical pattern indicative of a machine-readable symbol based on the downscaled descriptor map; wherein producing a downscaled descriptor map includes: partitioning the image frame into blocks; and for each block: computing a downscaled descriptor based on an S-transform operation to produce a vector representative of that block; and computing a convolutional descriptor based on the vector of the block convolved with a kernel that includes vectors of neighboring blocks; wherein the downscaled descriptor map includes a set of convolutional descriptors of the blocks.

DETAILED DESCRIPTION

Figure 1:
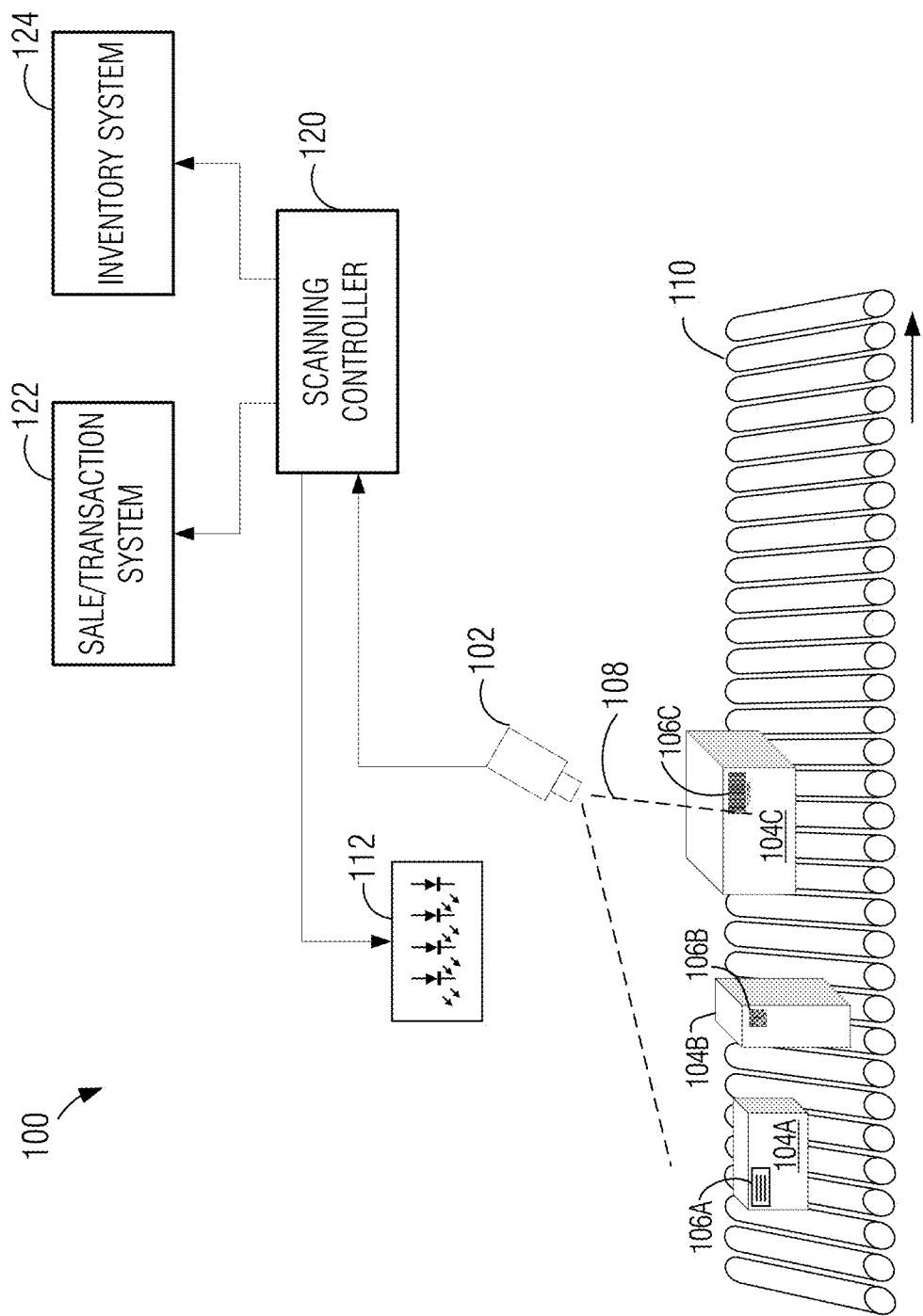
FIG. 1 is a simplified diagram illustrating a scanning system, as it may be employed in a basic usage scenario, according to some embodiments.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Aspects of the present disclosure are applicable to fixed-position symbol-reading systems that are designed to scan objects which are moved through a scanning volume, and mobile or handheld symbol-reading systems which may be aimed in different directions and capture scenes with varying backgrounds and lighting conditions. In the present context, scanning of an object includes reading one or more symbols that are on the object.

FIG. 1 is a simplified diagram illustrating scanning system 100, as it may be employed in a basic usage scenario, according to some embodiments. System 100 includes image-capture device 102, which may be implemented as a camera with an image sensor, objective lens, aperture, housing, etc. Image capture device 102 is arranged to capture image frames of scanning volume 110, and may be incorporated in a fixed, mobile, or handheld scanner.

The image sensor according to various implementations may include an array of photosensing elements. Examples of photosensing elements include complementary metal-oxide semiconductor (CMOS) sensors, charge-coupled devices (CCDs), and the like. The image sensor may be constructed using any suitable technology, whether known or arising in the future. Without limitation, some other examples include a high-dynamic-range (HDR) sensor array, a hyperspectral sensor array, a polarized sensor array, or the like.

In some implementations, scanning system 100 includes illumination system 112, which is arranged to illuminate scanning volume 110. Illumination system 112 may include an array of light-emitting diodes that produce light in suitable wavelength(s). The wavelength(s) may be in the visible-light spectrum, or in the infrared or ultraviolet spectra, and may include wavelengths falling into one or more of these bands. Other light sources, such as incandescent or discharge lamps are also contemplated.

Image-capture device 102 and illumination system 112, or other input, are each operatively coupled to scanning controller 120, which controls their operation and processes the captured images to read symbols 106A, 106B, and 106C, which may be on respective objects 104A-104C passing through scanning volume 108. In fixed-scanner embodiments, objects 104A-104C may be transported through the scanning volume 108. In mobile or handheld embodiments, scanning volume 108 is movable with the movement and repositioning of image-capture device 102.

Image-capture device 102, and illumination system 112, may be operatively coupled to scanning controller 120 through a suitable local interface (e.g., USB, Ethernet, etc.) or may be integrated with the image processor system and interconnected using one, or a combination of, internal interconnect(s) such as a suitable variant of a peripheral component interconnect (PCI), serial AT Attachment (SATA), mobile industry processor interface (MIPI), controller area Network (CAN), inter-integrated circuit ($I^2C$), or other interconnect(s) known by those skilled in the art. In some implementations, as depicted, scanning controller 120 may be operatively coupled to a sales or transaction system 122 or an inventory system 124 through a network 114 (e.g., LAN, WAN, PAN, Internet).

In the usage scenario depicted, each object 104, which has machine-readable symbol 106 is moved through scanning volume 108 to be scanned. Symbol 106 may be a 2D symbol, such as (e.g., Maxicode, QR, Aztec, Datamatrix), or the like. Object 104 may be moved manually by an operator, or by an automated conveyance system 110, such as vehicle, robotic arm, crane, elevator, conveyor belt, turntable, blower, or the like. The automated conveyance system may be powered or unpowered (e.g., gravity-based).

Notably, scanning system 100 includes a convolutional neural network (CNN) and related features, detailed below, which advantageously facilitate detection of symbol 106, and to distinguish symbol 106 from other objects or structures, or even other symbols which are not of interest, within scanning volume 108. Some embodiments of scanning controller 120 take advantage of single input, multiple data (SIMD) and tensor processing unit (TPU) which are increasingly becoming a part of many digital platforms, as well as field-programmable gate array (FPGA) instruction processors designed to support machine-learning algorithms.

In aspects of the invention, performance and efficiency are achieved through the use of a low-density descriptor, extracted from the image pixel data, that builds a set of small but informative maps which scale at least linearly, and in some cases, sub-linearly, with the image size (more particularly, in some implementations, it scales with the square root of the image size). In some embodiments, the descriptor map is based on the S-transform and an image descriptor which may be implemented in hardware and optimized for SIMD architectures. Other implementations may share the same principle of a lower density descriptor, either engineered or learned from the data, scaling at least linearly with the image size.

Figure 2:
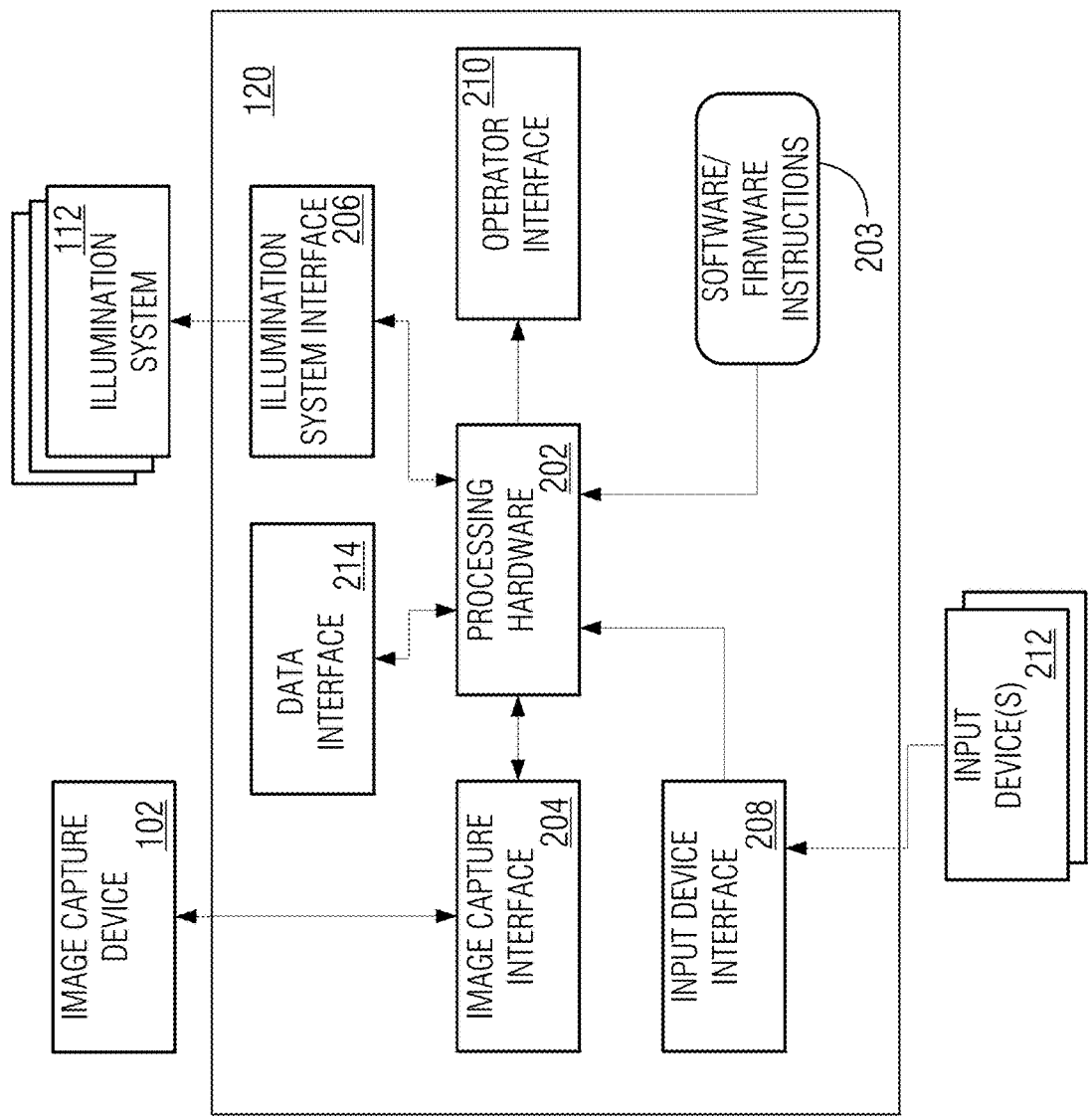
FIG. 2 is a high-level block diagram illustrating an example system architecture of a scanning controller and its interface with some other parts of the scanning system of FIG. 1.

FIG. 2 is a high-level block diagram illustrating an example system architecture of scanning controller 120 and its interface with some other parts of scanning system 100. Scanning controller 120 includes processing hardware 202 operatively coupled to image-capture device interface 204, input-device interface 208, operator interface 210, data interface 214, and illumination system interface 206. Processing hardware 202 includes one or more processor circuits that execute software or firmware instructions 203, which instructions are stored in a non-transitory machine-readable medium such as a read-only memory, flash memory, random-access memory, or the like.

Image-capture device interface 204 includes circuitry facilitating the exchange of data between processing hardware 202 and image-capture device 102. In some examples, image-capture device interface 204 includes data buffers, video decoders, video encoders, address and data bus interfaces, serial data receiver/transmitter circuitry, analog-to-digital (A/D) converter circuitry, and the like. The data communications portions of image-capture device interface 204 may facilitate wired or wireless communication. Image-capture device interface 204 is operative to pass its output (e.g., activated pixels, images, video frames) from their original format as output by image-capture device 102 to processing hardware 202 in a suitable data format to be read by processing hardware 202. In a related example, image-capture device interface 204 may additionally be configured to pass information from processing hardware 202 to image-capture device 102. This upstream information may include configuration commands such as sensor gain settings, frame rate, exposure control, activation/deactivation commands, etc.

In some embodiments, image-capture device interface 204 may be integrated as part of a digital signal processor (DSP) device or microcontroller device. In other embodiments (not shown), image-capture device interface 204 may be integrated as part of one or more image-capture devices 102.

Illumination system interface 206 includes circuitry to control the operation of individual ones, or groups, of the photo emitters of illumination system 106. Illumination system interface 206 may include current regulator circuitry, switching circuitry, or the like.

Input device interface 208 includes circuitry to interface with input device(s). Examples of such input devices include sensors, such as a ranging sensor, motion sensor, thermometer, humidity sensor, precipitation sensor, smoke/particulate sensor etc.

Operator interface 210 includes user-operable controls, such as pushbuttons, keypad, touchscreen, and the like, as well as a display or indicators such as a liquid-crystal display (LCD), LED indicators, speaker or buzzer, and other suitable output devices.

Data interface circuitry 214 includes wired or wireless communications facilities that provide input and output to and from processing hardware 202. Sale or transaction system 122, inventory system 124, or other external device or system may be operatively coupled to scanning controller 120 via data interface circuitry 214. Data interface circuitry 214 may include one or more of the following types of communication circuits: universal serial bus (USB), CAN, I²C, SPI, UART, I²C, Ethernet, personal-area network such as Bluetooth according to an IEEE 902.15 standard, Wi-Fi according to an IEEE 902.11 standard, or the like.

Other data reader configurations may be used without departing from the principles of the disclosed subject matter. Examples of various data reader configurations include U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,996, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGES OF AND DECODE INFORMATION FROM MACHINE-READABLE SYMBOLS," and U.S. patent application Ser. No. 18/071,594, filed Nov. 29, 2022, and entitled "FIXED RETAIL SCANNER WITH MULTI-PORT NETWORK SWITCH AND RELATED METHODS, the disclosure of each of which is incorporated by reference herein in its entirety.

Figure 3:
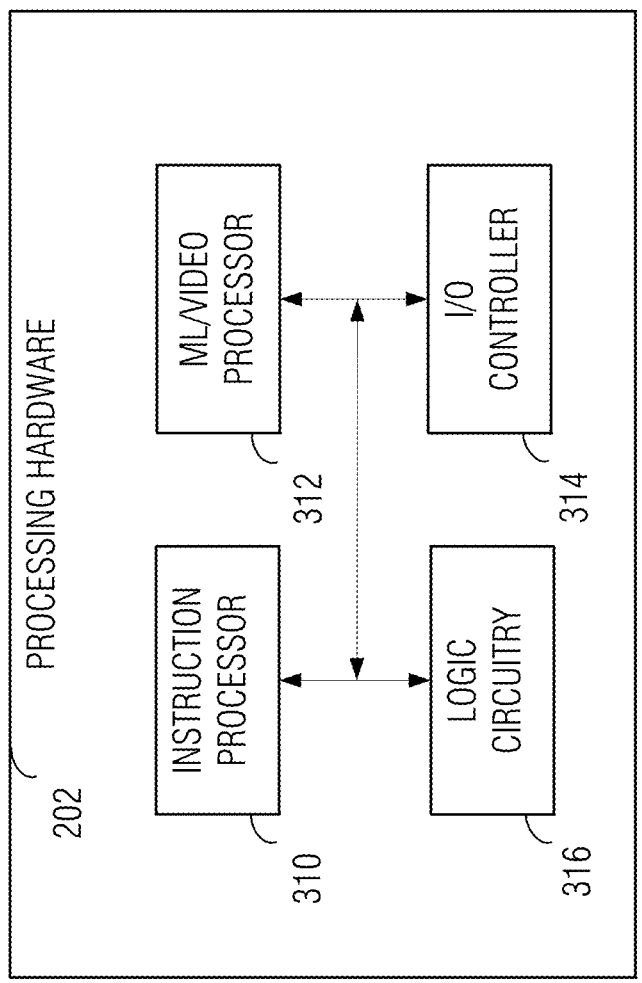
FIG. 3 is a simplified block diagram illustrating a portion of processing hardware of the scanning controller of FIG. 2 according to one example.

FIG. 3 is a simplified block diagram illustrating a portion of processing hardware 202 of scanning controller 120 according to one example. Processing hardware 202 includes instruction processor 310, ML/video processor 312, and input/output (I/O) controller 314. Instruction processor 310 is constructed to execute software or firmware instructions 203, the execution of which causes instruction processor 310 to implement engines (defined below) to carry out the overall functionality of scanning system 100 in conjunction with the other components of scanning controller 120, image capture device 102, illumination system 112, or input device(s) 212, as shown in FIGS. 1-2. For instance, instruction processor 310 may read input device interface 208 and take actions in response to those inputs; instruction processor 310 may write output to operator interface 210; and instruction processor 310 may exchange data with data interface circuitry 214 to send and receive data to or from other devices or systems. In addition, instructions 203, when executed by instruction processor 310, may cause instruction processor 310 to carry out symbol detection, movement tracking, training, decision logic, and symbol reading operations, as well as other functionality, to operatively implement scanning system 100.

Instruction processor 310 may be of any suitable architecture. As an example, instruction processor 310 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

ML/video processor 312 is interfaced with instruction processor 310, and implements engines to receive captured images from image capture device 102, and to implement a low-dimensional feature extractor, a convolutional descriptor, pattern detector and coarse estimation pipeline, resample, crop, compress, or combine portions of images, filter, remove background, assess the size of a detected object, track motion of a detected object, and perform symbol reading algorithms, where applicable. In some embodiments, ML/video processor 312 includes a digital signal processor (DSP) core having a computing architecture that is optimized for machine learning, e.g., SIMD, TPU, or video processing, e.g., including additional or specialized arithmetic logic units (ALUs)-direct-memory access, fixed-point arithmetic, etc., ASIC, FPGA, CPLD, or combination thereof.

I/O controller 314 includes circuitry that facilitates addressing, data transfer, memory access, and other interactions between instruction processor 310, ML/video processor 312, and the other components of scanning controller 120. As examples, I/O controller 314 may include a bus or system interconnect controller, a serial communications hub controller, or the like.

In related embodiments, instruction processor 310 and ML/video processor 312 are integrated as a single processing device, such as a digital signal controller (DSC) that is configured to perform the respective functionality of instruction processor 310 and ML/video processor 312 described above. Similarly, I/O controller 314 may also be integrated as part of a DSC implementation. In other related embodiments, some portion of processing hardware 202 may be implemented with logic circuitry 316, such as an application-specific integrated circuit (ASIC), FPGA, CPLD, hardware coprocessor, or the like. Logic circuitry 316 may be utilized to perform certain operations with greater speed or power efficiency than can be conventionally achieved using an instruction processor, such as S-transform computation, phase correlation operations, or the like.

Figure 4:
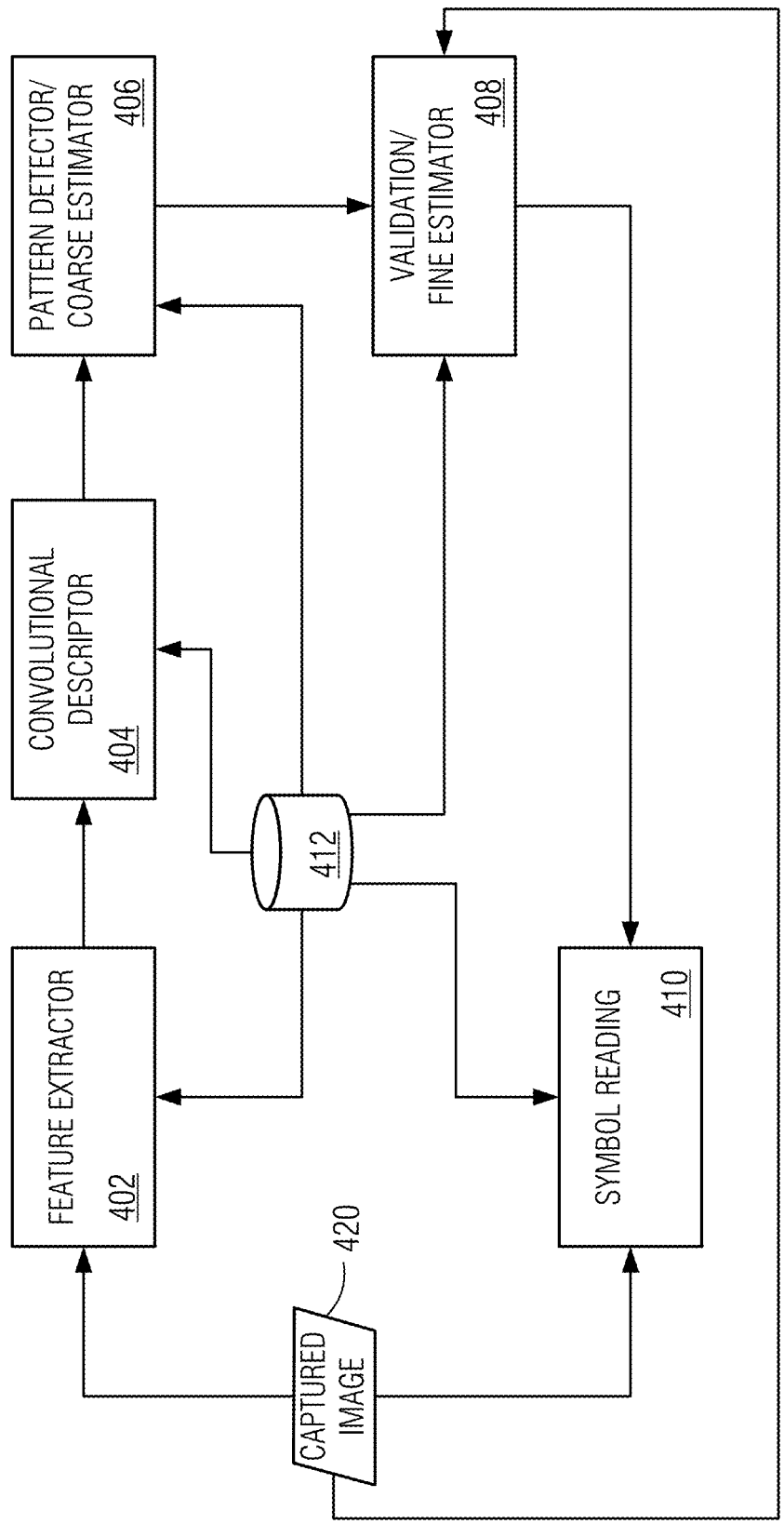
FIG. 4 is a high-level functional architecture diagram illustrating some of the engines of the scanning controller of FIG. 2 according to an example embodiment.

Scanning controller 120 implements various engines, each of which is constructed, programmed, or otherwise operative, to carry out a function or set of functions, as detailed below. FIG. 4 is a high-level functional architecture diagram illustrating some of the engines of scanning controller 120 according to an example embodiment. In this example, scanning controller 120 includes feature extractor engine 402, convolutional descriptor engine 404, pattern detector and coarse estimator engine 406, validation and fine estimator engine 408, and symbol-reading engine 410.

The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible, non-transitory, machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Engines 402-408, collectively, are constructed, programmed, or otherwise operative, to process each captured image frame 420 from image-capture device 102 to assess whether any symbol 106, which is distinct from the background and objects within of scan volume 110, is present. Detection of a symbol 106 is a prerequisite to attempting to read that symbol 106.

Symbol reader engine 410 is constructed, programmed, or otherwise operative, to read machine-readable symbol(s) that have been detected by engines 402-408 from captured image frame 420. Any suitable image-processing algorithm may be utilized by symbol reader engine 410 such as, for instance, the techniques described in U.S. Pat. No. 9,361,503, the disclosure of which is incorporated by reference herein.

Data store 412 maintains adjustable parameters or constants for use with algorithms executed by engines 402-410. Such parameters or constants may be user-configurable in some implementations. In related implementations, such parameters may be adaptively adjusted by the algorithms themselves, such as being adjusted by optimizing algorithms, training algorithms, or the like. In the latter example, training data or models may be maintained in data store 412.

Although the engines depicted in FIG. 4 may be implemented as distinct functional blocks, it should be understood that the various functionality of certain engines may be implemented, in whole or in part, as a subset of one or more of the other engines. For example, certain processing facilities, such as transform-space processing, may be shared among various engines. For example, symbol reader engine 410 may employ a transformation engine, such as an S-transform engine, which may be utilized by feature extractor engine 402.

Feature extractor engine 402 is operative to accept as its input the captured 2D image image-capture device 102 and return a lower-dimensional descriptor map (i.e., a tensor) where the number of rows and columns of the descriptor map is significantly smaller than the number of rows and columns of pixels of the original input image. In an example implementation, the subsample factor is equal to 8, both horizontally and vertically, making the descriptor map size 64 times less than the input image (when the border effect is neglected or when padding is used). Depending on the application, other subsample factors may perform better than this example value.

In a related implementation, feature extractor engine 402 uses processing parallelism, meaning that multiple descriptors can naturally be computed in parallel and independently of one another, and the computation can take advantage of underlying hardware for SIMD or TPU execution.

Each descriptor in the map can be considered as a feature vector representing a small portion of the original image, which, in one example, is generally squared with block size equal to the subsample factor. In other implementations the descriptor may be computed using a trainable block such as a convolutional neural network with a different number of features.

Figure 5:
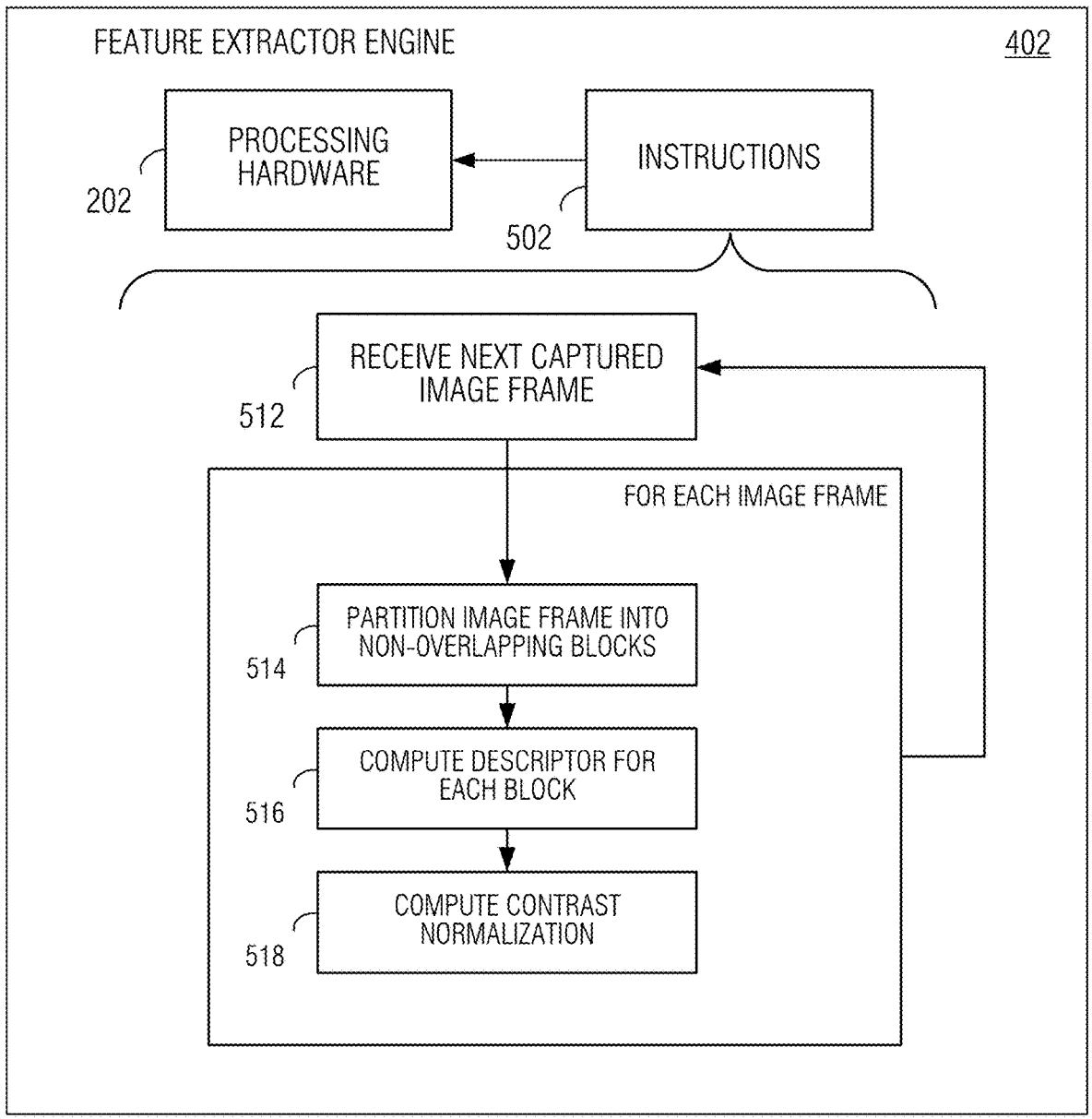
FIG. 5 is a structural diagram illustrating a feature extractor engine according to an example embodiment.

FIG. 5 is a structural diagram illustrating feature extractor engine 402 according to an example embodiment. As depicted, feature extractor engine 402 includes processing hardware 202, and instructions 502 stored on one or more non-transitory storage media and executable by processing hardware 202 to implement feature extractor engine 402 according to this example. Instructions 502, when executed, cause processing hardware 202 to implement the following process, which may be performed with different orderings of operations unless certain operations are specifically called out as being performed in sequence. In some variations, certain operations may be modified or omitted.

At 512, feature extractor engine 402 receives a captured image frame 420. The following operations are repeated for each captured image frame 420. At 514, feature extractor engine 402 downscales the captured image frame 420. In one example of such downscaling, the captured image frame 420 is partitioned into non-overlapping and square blocks with a block size of 8×8=64 pixels. Although the blocks are non-overlapping, the subsequent convolutional operations may go outside the boundaries of the block into the adjacent ones.

Other block sizes are also possible i.e., 12 could be the best trade-off for low resolution 2D barcodes, while significantly reducing the number of blocks in the image and consequently halving the processing time ((12*12)/(8*8) =2.25). In a related embodiment, the block sizes may vary based on the application specific needs or prior information, for example fixed reading distance, known printing resolution, etc.

At 516, for each block, a descriptor is computed. In one approach, within each block the horizontal and vertical component of the S-transform are computed using a convolutional 3×3 kernel and averaged within the block. The S-transform operation produces a vector map (e.g., magnitude and angle of each vector corresponding to each block).

Other implementations may use other non-engineered or learned kernels of various sizes. In some implementations, the S-transform process may be performed prior to, or independently from, other processing operations, such as via a hardware engine (e.g., FPGA) or using an optimized processor, such as a RISC processor (e.g., ARM) which executes a specialized processing library.

At 518, feature extractor engine 402 optionally performs contrast normalization. In one such implementation, morphological components corresponding to each block are computed from the original image. In one approach, the morphological components are maximum and minimum values corresponding to each block, and arranged as morphological maps. In other variations, morphological maps include cutting the white and black level tails using quantile analysis and applying other morphological operators such as dilation and erosion on the map's domain (e.g., so to have a more global representation of the grayscale levels).

Figure 6:
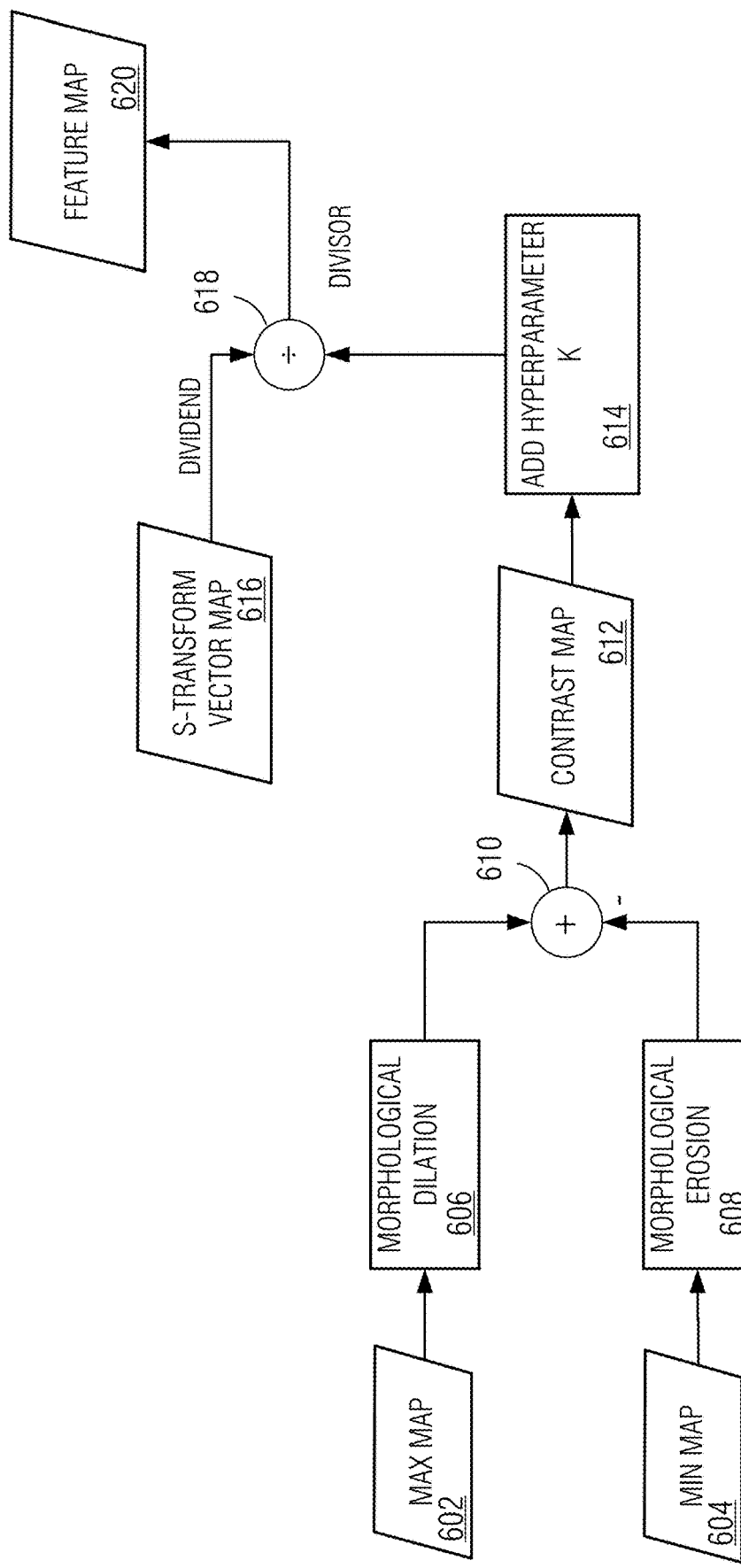
FIG. 6 is a flow diagram illustrating an example process of performing contrast normalization according to some embodiments.

FIG. 6 is a flow diagram illustrating an example process of performing contrast normalization according to some embodiments. As depicted, morphological component maps, of MAX 602 and MIN 604, are processed, respectively, by morphological dilation 606 and morphological erosion 608. At 610, the output of morphological erosion block 608 is subtracted from the output of morphological dilation block 606 to produce contrast map 612. At 614, hyperparameter k is added to contrast map 612 in order to slightly favor higher contrast values with respect to lower ones. Contrast map 612 with added hyperparameter k is fed to division operation 618 as the divisor. S-transform vector map 616 (which is the output from operation 516) is fed to division operation 618 as the dividend. The result of the element-by-element division is contrast-normalized feature vector 620.

In a related embodiment, various parameters used by feature extractor engine 402 are set based on the needs of the application of scanning system 100. These variable parameters include block size, whether or not to perform contrast normalization at 518, the value of hyperparameter k, or the like, and may be set and stored in data store 412 for use by image-capture device 102.

Turning again to FIG. 4, convolutional descriptor engine 404 accepts as its input feature map the contrast-normalized feature map 620 (or, for embodiments that forgo contrast normalization, S-transform vector map 616). Convolutional descriptor engine 404 computes a convolutional (flattened) description for each position (i.e., block descriptor) of the input feature map using a kernel comprising that position's neighbors. The result is a convolutional descriptor map.

For instance, in one embodiment, a 3×3 kernel comprising each position of the input feature map's position along with each of its neighbors on each side is used. Since each position of the input feature map includes a two-dimensional vector, i.e., amplitude and phase angle, the convolution operation produces 2×3×3=18 values per block descriptor. In other embodiments, other size kernels, such as a, 5×5 kernel, or 7×7 kernel, centered at each of the input feature map's position is used in the convolution operation. Expansion of the kernel size effectively increases the receptive field of each position of the convolutional descriptor map. In other embodiments, to further reduce the compute, a smaller kernel than 3×3 can be used, for instance a kernel comprising each position, and its neighbors above, below, and on each side, may be used. Or, a kernel comprising each position, and its four neighbors at the corners may be used to compute the convolution operation by convolutional descriptor engine 404. In other embodiments, a sequence of more than one convolutional layer (each with its activation function) is concatenated before flattening the descriptor.

In a related embodiment, the kernel size or shape may be varied based on application needs or environmental condition. For instance, in a fixed-reader application, the kernel size may set based on the nominal distance from the reader to the target region where objects pass within scanning volume 108 of the reader. As another example, the kernel size may be varied based on ambient lighting conditions, particulate matter (dust) in the environment, presence of reflective surfaces, or other factors that tend to complicate video processing. these parameters may be set and stored in data store 412 for use by convolutional descriptor engine 404.

Referring again to FIG. 4, the convolutional descriptor map produced as the output of convolutional descriptor engine 404 is fed to coarse estimator engine 406, which process the convolutional descriptor map to detect the presence of a symbol. As described in greater detail below, coarse estimator engine 406 may be trained with multiple distinct pattern types, such as finder patterns such for Maxicode bull's eye, Aztec, QR, Han Xin and anisotropic datamatrix "L."

Figure 7:
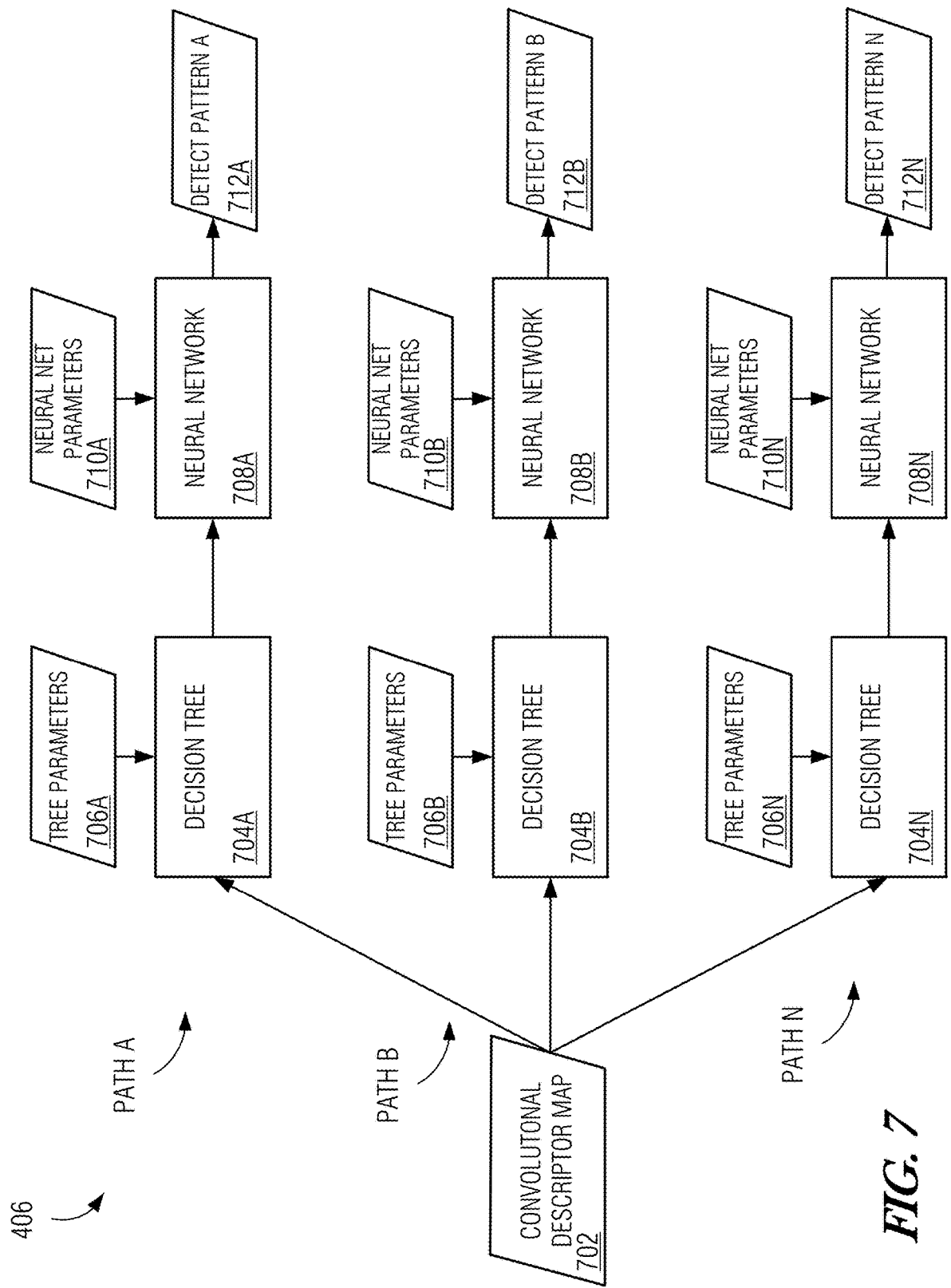
FIG. 7 is a block diagram illustrating a multipath architecture of a coarse estimator engine according to some embodiments.

FIG. 7 is a block diagram illustrating a multipath architecture of coarse estimator engine 406 according to some embodiments. As depicted, convolutional descriptor map 702 is passed to parallel paths, Path A, Path B, . . . , Path N. Each path includes a decision tree cascaded with a neural network, both trained on a particular pattern. Accordingly, Path A includes decision tree 704A configured with decision-tree parameters 706A corresponding to pattern A, and neural network 708A configured with neural network parameters 710A corresponding to pattern A. Decision tree 704A and neural network 708A implement a logical AND function, meaning that, for pattern A to be detected by Path A, both, 704A, and neural network 708A must indicate a positive detection of pattern A. If the criteria of both, decision tree 704A, and neural network 708A, is satisfied, indication of detection of pattern A 712A is output. Moreover, metadata that is useful for localizing the pattern within the image is provided, as described below.

Similarly, Path B includes decision tree 704B configured with decision-tree parameters 706B corresponding to pattern B, and neural network 708B configured with neural network parameters 710B corresponding to pattern B. Additional distinct paths are provided for each pattern to be detected. Accordingly, Path N includes decision tree 704N configured with decision-tree parameters 706N corresponding to pattern N, and neural network 708N configured with neural network parameters 710N corresponding to pattern N. Paths B-N each produce detections of their respective patterns B-N, as indicated at 712B and 712N. If a given pattern fails to result in a detection by any stage of any path, the captured image can be discarded as not having a scannable symbol and further processing operations of the captured image are advantageously avoided.

Paths A, B, . . . , N may be trained using synthetic data which includes a combination of real background images, computer fonts, barcode generation software, and mathematical models of noisy camera systems to create realistic training data for machine learning systems. For instance, a synthetic training data set may include tens of thousand images that each contain a single 2D barcode finder pattern within a generated image and associates each with the ground truth of the generative parameters, such as the coordinate of the center, the direction of the main pattern vectors, the perspective distortion, the pixel per element, and the like.

Figure 8:
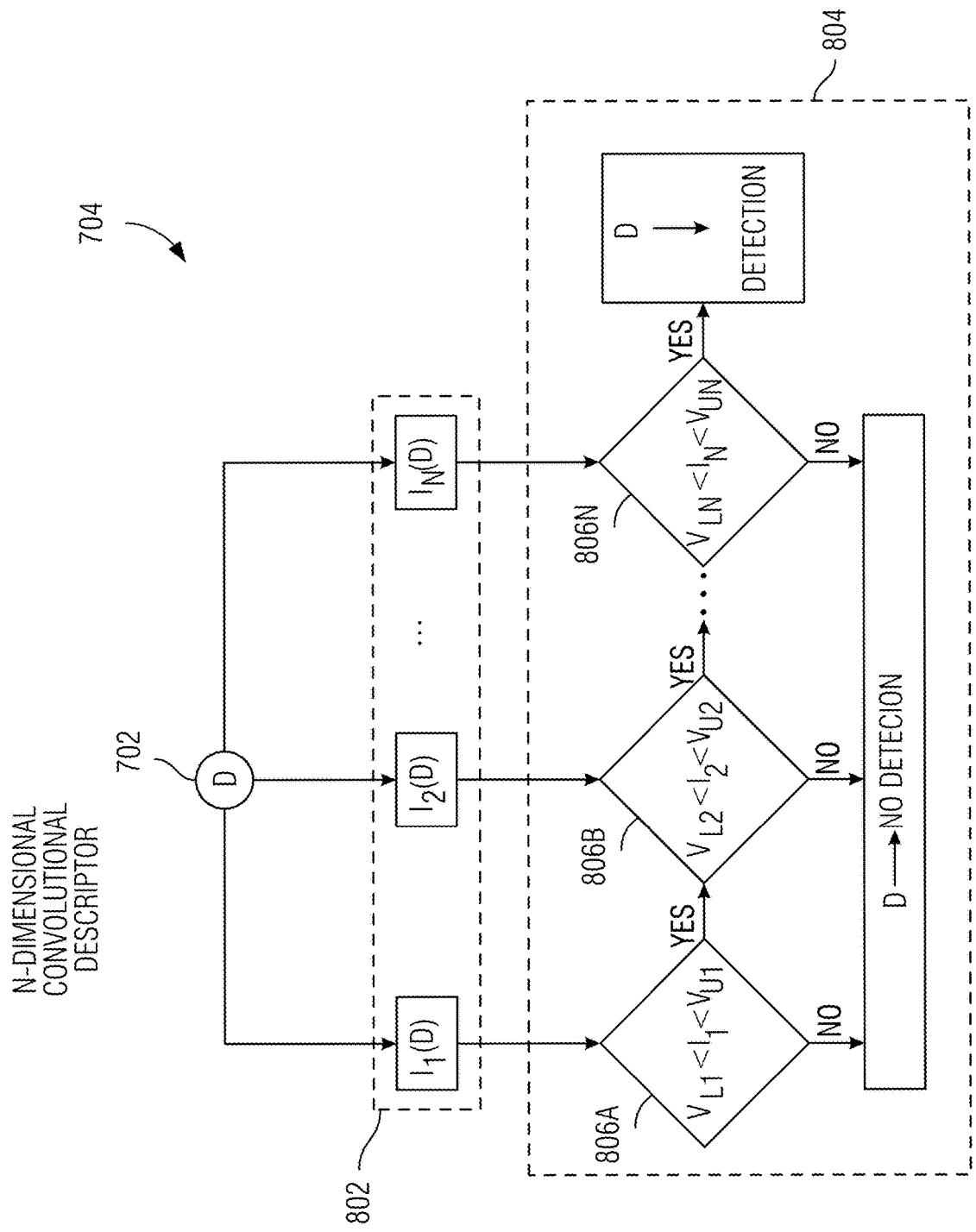
FIG. 8 is a flow diagram illustrating, at a high level, operation of a decision tree of the coarse estimator of FIG. 7 according to some embodiments.

FIG. 8 is a flow diagram illustrating, at a high level, operation of decision tree 704 according to an example implementation. As depicted, decision tree 704 is a single-branch model, i.e., decision stump, based on cascaded logical-ANDs. When operative in its inference mode, at operation 802, the input D, which is convolutional descriptor map 702, is augmented by linear and non-linear interaction terms $I_1, I_2, \ldots I_N$ as may be provided by corresponding decision-tree parameters 706. Operation 804 contains the decision logic, which includes comparators 806A, 806B, . . . , 806N corresponding respectively to interaction terms $I_1, I_2, \ldots I_N$. Each comparator tests whether the corresponding augmented convolutional descriptor map falls within a defined range of low values $V_{L1}, V_{L1}, \ldots, V_{LN}$, and upper values $V_{U1}, V_{U1}, \ldots, V_{UN}$. If each successive condition is met, input D is deemed to contain a known symbol type. Otherwise, if any comparator's condition is not met, input D is deemed to not contain a known symbol type. Stated another way, on any failure of detection, the input D is immediately discarded, while any input D passing all the conditions of the tree is passed to the next stage in the processing path.

In some embodiments, decision tree 704 is trained based on quantile analysis. In particular, first the descriptor for each synthetic 2D finder pattern is computed, and for each descriptor the dimensionality is augmented through the interaction terms. The collection of the interaction terms, is then bounded in each dimension by a lower and an upper value. Those values are computed in such a way that a predefined ratio of true patterns pass all the decision tree conditions, and the computed values become the trained thresholds of the decision tree. In some embodiments, every path, corresponding to a specific type of 2D finder pattern is trained independently.

Decision tree 704 may be regarded as a binary one-class classifier (it can be trained using only the positive class and the negative class does not have to be represented) and may be trained to have a recall of greater than 0.99.

By design decision tree 704 is parallelizable and can naturally be optimized on SIMD and remapped into a custom neural network architecture for taking advantage of any TPU which may be available. For further improving the optimization, false candidates discard rate of each condition can be measured on a list of "negative" descriptors (not having a target pattern) and the conditions could be evaluated in a descending order of their false candidates discard rate (the higher discard rate first) so as to skip, with highest probability, the evaluation of all the subsequent conditions for negative patterns.

In some embodiments, each neural network 708 is a fully-connected multi-headed network designed as a you-only-look-once (YOLO) model with a particular loss function, training procedure, and network quantization technique. In an example implementation, the network size may be about 2k parameters but could be shrunk down to half this size or less.

At inference time neural network 708 accepts as its input only the convolutional descriptor map 702 which passed the decision tree. In some implementations, between the decision tree 704 and neural network 708 the descriptors with a positive detection are copied in adjacent memory locations while maintaining a backward reference to their original position in the descriptor map. This facilitates a more efficient and parallel computation of the network inference (and other processing stages downstream).

Figure 9:
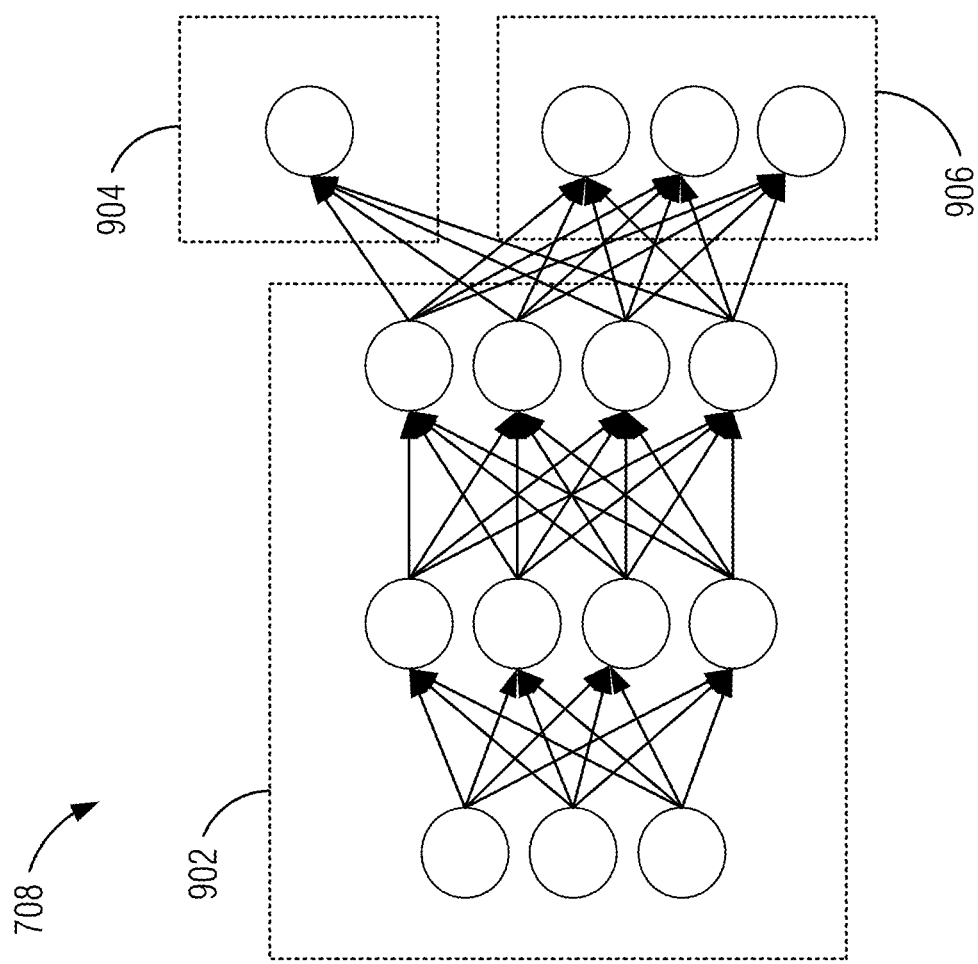
FIG. 9 is a diagram illustrating an exemplary architecture of a neural network of the coarse estimator of FIG. 7 according to some embodiments.

FIG. 9 is a diagram illustrating an exemplary architecture of neural network 708. As depicted neural network 708 has fully interconnected nodes in several layers, including includes feature backbone layers 902, and two types of output nodes, detection node 904, and estimation nodes 906. Detection node 904 provides a score corresponding to the input descriptor which represents a confidence level that the input descriptor is a detected pattern. Estimation nodes 906 are relevant for only positively-detected patterns. They indicate the location and orientation of the pattern within the image. For instance:

(x,y): coordinate in the original image coordinate system;

$(h_x,h_y)$: estimation of the horizontal vector of the pattern, with the pixel per element encoded in the vector module and the direction in the vector angle; and $(v_x,v_y)$: estimation of the vertical vector of the pattern, with the pixel per element encoded in the vector module and the direction in the vector angle.

Advantageously, the metadata provided by estimation nodes 906 are usable by symbol reader engine 410 to initiate image analysis at the appropriate location, angle, and skew correction. Notably, this information is discerned from processing of the downscaled convolutional descriptor map 702, which is computationally substantially more efficient than conventional image processing of the captured image to obtain such information for use by symbol reader engine 410.

For training neural network 708, both the positive and negative patterns are used: the positive patterns are represented by the same descriptors (one for each synthetic 2D finder pattern) that have been used for training decision tree 704, while the negative patterns are represented by a list of descriptors coming from the descriptors computed on a negative image dataset of the most common backgrounds (text, fabric, Styrofoam, 1D barcodes, etc.). Preferably, only the negative descriptors passing through decision tree 704 are used for training neural network 708.

In an example, the loss function for neural network 708 may be expressed as:

$$\sum_i (d_i - \hat{d}_i)^2 + \omega_c \sum_i 1_i^{(patt)}[(x_i - \hat{x}_i)^2 + (y_i - \hat{y}_i)^2] +$$

$$\omega_v \sum_i 1_i^{(patt)} \sum_{v \in \{v_h, v_v\}} [(v_{x_i} - \hat{v}_{x_i})^2 + (v_{y_i} - \hat{v}_{y_i})^2]$$

In this loss function, three distinct contributions are weighted and added:

Detection loss (di): represents the classification error where the MSE loss (combined with the custom activations) is used in place of the cross-entropy in order to have a smoother trend between the "no detection" and "detection". This allows to configure an intuitive threshold at inference time so to allow for more or less aggressive detection.

The center of pattern estimation: a conditioned weighted mean-squared error (MSE) loss with respect to the ground truth. The condition is true if and only for true patterns and there is no loss for descriptors representing false patterns.

The pattern direction estimation: a conditioned weighted MSE loss with respect to the ground truth. The condition is true if and only for true patterns and there is no loss for descriptors representing false patterns.

At inference time, all the input descriptors which are not activating the detection neuron above a configurable threshold (between 0 and 1) are removed by the list of possible candidates, while the others are copied in adjacent memory locations with their associated metadata (a backward reference to their original position in the descriptor map).

Referring again to FIG. 4, in embodiments that utilize validation and fine estimator engine 408, a small fully-connected multi-headed network topologically similar to neural network 708 is provided for each output of paths A, B, and N, but with some modification. The network size is comparable to in size to neural network 708, with about 2k parameters, but the neural network of validation and fine estimator engine 408 is not quantized. Validation and fine estimator engine 408 has two inputs: the first, from coarse estimator engine 406, provides an indication of the size and location of the detected pattern; the second input is captured image 420. In particular, fine estimator engine 408 uses the size and location of the detected pattern to extract the pixel values (e.g., via bilinear interpolation) of captured image 420 for the pattern detected by coarse estimator engine 406. Notably, the image input to validation and fine estimator engine 408 bypasses feature extractor engine 402 and convolutional descriptor engine 404.

In one implementation, two segments are drawn, each of which is centered on the estimated center coordinates (x,y) of any given detected pattern; one segment is in the estimated horizontal direction ($h_x$, $h_y$) and the other in the vertical estimated direction ($v_x$, $v_y$), while the samples distance is half of the estimated pixel per element in each direction (i.e., for the vertical direction=$\sqrt{v_x^2+v_y^2}$). Sampling 4.5 pixels per elements on both sides, the input of the network is a 19-d vector of grayscale samples.

In the network of validation and fine estimator engine 408, the output node in the position of detection node 904 of neural network 708 is a confirmation node which indicates a score indicating a confidence level of pattern detection. For true targets only, the estimation nodes 906 represent additional information about the targets:

polarity of the pattern, i.e., black over white or white over black;

($delta_x$, $delta_y$): correction on the center estimation;

($delta_{hx}$, $delta_{hy}$): correction of the estimation of the horizontal vector of the pattern (scale only);

($delta_{vx}$, $delta_{vy}$): correction of the estimation of the vertical vector of the pattern (scale only).

In some embodiments, for training the network of validation and fine estimator engine 408 both the positive and negative patterns are used: the positive patterns are represented by the 19-d vector presented above (2 for each synthetic 2D finder pattern) that have been used for training the decision tree of coarse estimator engine 406, while the negative patterns are represented by a list of descriptors coming from similar samples in the form of 19-d vectors of a negative image dataset. Note that only the negative descriptors passing coarse estimator engine 406 are actually used for training the neural network of validation and fine estimator engine 408. The loss function is similar to the one described above for neural network 708.

At inference time, if none of the two vectors (horizontal and vertical) activates the confirmation node above a configurable threshold (set between 0 and 1) the corresponding pattern is removed from the list of possible candidates, while any pattern with at least one of the two scans activating the same node is considered a true pattern and sent to symbol reader engine 410 with its associated metadata.

In the multi-path architecture of coarse estimator engine 406 and validation and fine estimator engine 408, the processing stream corresponding to each detectable finder pattern is entirely independent from those of the other detectable patterns. Advantageously, the system may be evolved to add detectable patterns or to train individual ones of the detection paths to refine the tree parameters and neural network parameters, without affecting the other paths. However, this architecture has certain computational redundancies and does not reuse intermediate computations within decision trees 704 and neural networks 708 or the neural networks within validation and fine estimator engine 408.

In some implementations, validation and fine estimator engine 408 is selectively employed based on the output of coarse estimator engine 406. In one approach, validation and fine estimator engine 408 is called only in response to the score at detection node 904 exceeding a predefined threshold. Accordingly, the computational cost of validation and fine estimator engine 408 is only accepted when the confidence level for a pattern detection indicates a sufficient likelihood that a pattern is detected. Moreover, only the fine detection and validation path of validation and fine estimator engine 408 which corresponds to the detected pattern (corresponding to the threshold-exceeding score at detection node 904) is activated.

In a related embodiment, validation and fine estimator engine 408 is called only in response to the score at detection node 904 falling within a predefined range. Accordingly, for a sufficiently high confidence score at detection node 904, further confirmation of that detection may be deemed unnecessary. However, for intermediate scores within the predefined range, further confirmation of detection may be obtained by operation of validation and fine estimator engine 408.

Figure 10:
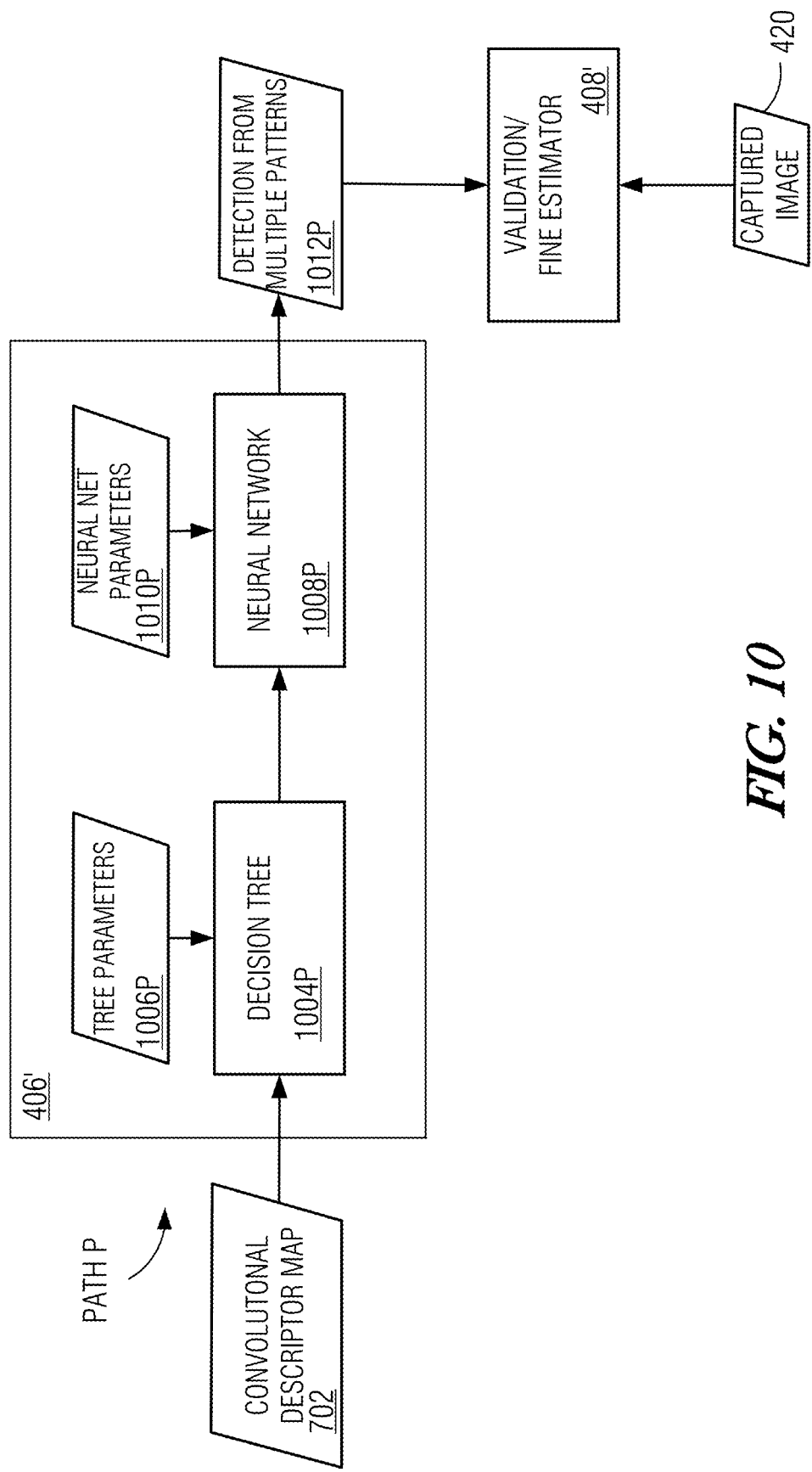
FIG. 10 is a high-level block diagram illustrating another type of architecture comprising a single computational path that supports the detection of multiple finder patterns according to some embodiments.

FIG. 10 is a high-level block diagram illustrating another type of architecture comprising a single computational path that supports the detection of multiple finder patterns. As depicted, single-path coarse estimator engine 406' receives as its input convolutional descriptor map 702. Single-path coarse estimator engine 406' includes decision tree 1004P, which is trained to detect from among multiple patterns based on tree parameters 1006P, cascaded with neural network 1008P, which is trained on a multiple patterns, as represented by neural network parameters 1010P. Indication of detection of a particular pattern 1012P from among multiple patterns, is output to single-path validation and fine estimator engine 408', which separately receives captured image 420 as its input. The single-path architecture heavily reuses all the intermediate values for all the patterns and provides some computational efficiency as compared to the multi-path embodiments. In this embodiment all the detectable patterns share a common part of the neural network backbone and its related hyperparameters, and the tuning of any single pattern detection is restricted to the individual detection neurons, which could be extended to include multiple layers.

Figure 11:
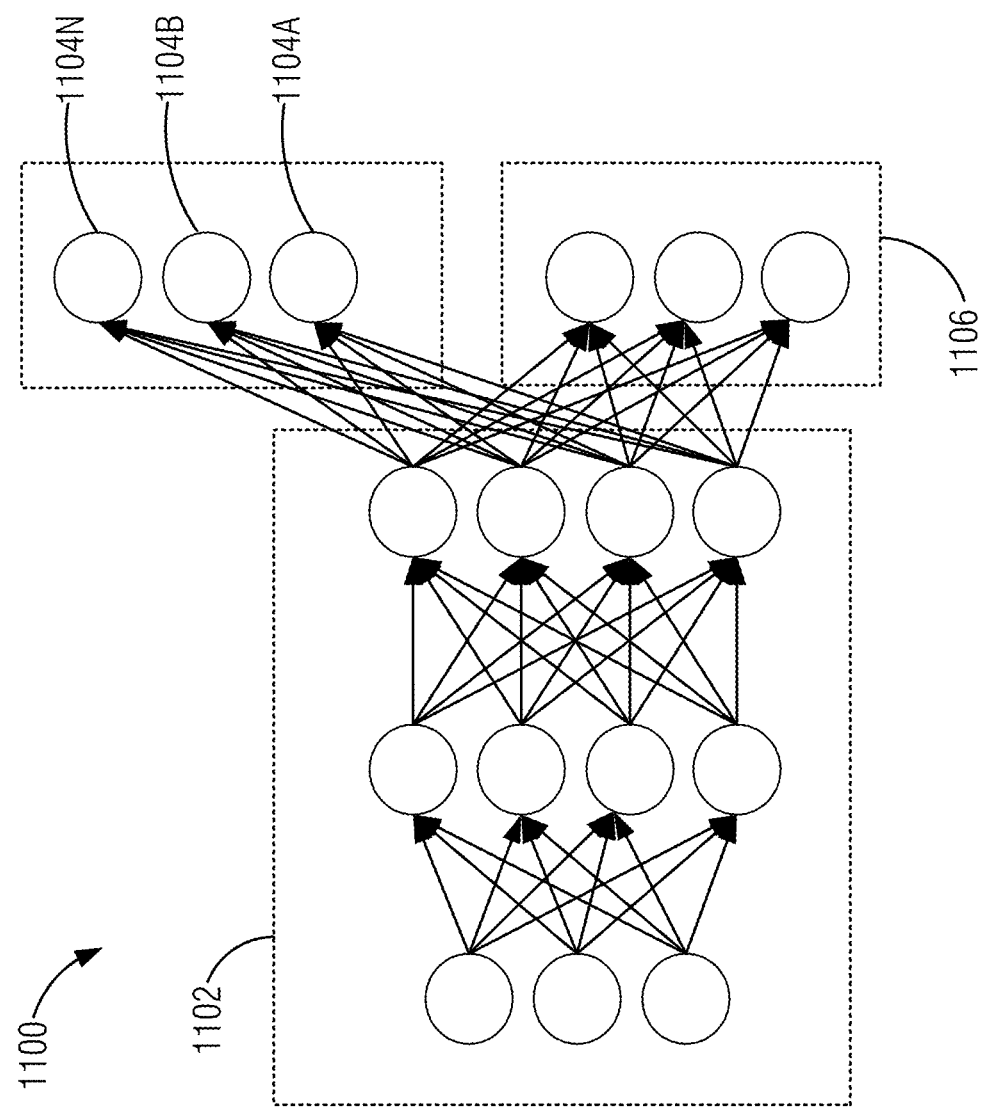
FIG. 11 is a diagram illustrating an example architecture of a neural network for use with the single-path architecture of FIG. 10.

FIG. 11 is a diagram illustrating an example architecture of a neural network for use with the single-path architecture of FIG. 10. This basic topology may be used as neural network 1008P or as the neural network in validation and fine estimator engine 408'. As illustrated, neural network 1100 includes feature backbone layers 1102 which are trained with multiple patterns. Neural network 100 has multiple detection nodes, 1104A, 1104B, 1104N, each corresponding to one of the detectable patterns for which neural network 1100 is trained.

Each detection node 1104A, 1104B, 1104N provides a score corresponding to the input descriptor which represents a confidence level that the input descriptor is a corresponding detected pattern. Estimation nodes 1106, similar to estimation nodes 906, correspond indicate the location and orientation of the highest-scoring pattern within the input image.

In another implementation, the architecture of neural the networks is further modified such that distinct neural networks are employed in coarse estimator engine 406 or validation and fine estimator engine 408 to process detection of a finder pattern separately from computing the metadata which includes the location and horizontal and vertical vectors of the pattern.

ADDITIONAL NOTES AND EXAMPLES

Example 1 is an optical symbol detector, comprising: an input operative to receive a captured image frame; a feature extractor engine coupled to the input to produce a downscaled descriptor map based on the captured image frame, the descriptor map including a convolutional map of blocks of the captured image frame; and a coarse estimator engine coupled to an output of the feature extractor engine to produce a detection indication and localization information of an optical pattern indicative of a machine-readable symbol based on the downscaled descriptor map.

In Example 2, the subject matter of Example 1 includes, wherein the feature extractor engine is operative to: partition the image frame into blocks; and for each block: compute a downscaled descriptor based on an S-transform operation to produce a vector representative of that block; and compute a convolutional descriptor based on the vector of the block convolved with a kernel that includes vectors of neighboring blocks; wherein the downscaled descriptor map comprises a set of convolutional descriptors of the blocks.

In Example 3, the subject matter of Example 2 includes, wherein the blocks are non-overlapping.

In Example 4, the subject matter of Examples 2-3 includes, wherein the blocks are square.

In Example 5, the subject matter of Examples 2-4 includes, wherein the blocks are 8×8 pixels.

In Example 6, the subject matter of Examples 2-5 includes, wherein in the computation of the convolutional descriptor, for each block, the kernel includes vectors representing neighboring blocks along each side of that block.

In Example 7, the subject matter of Example 6 includes, wherein the kernel is 3×3 blocks.

In Example 8, the subject matter of Examples 1-7 includes, wherein the feature extractor engine is arranged to computed multiple descriptors of the descriptor map in parallel and independently of one another.

In Example 9, the subject matter of Examples 1-8 includes, wherein the feature extractor engine is further operative to perform contrast normalization of the convolutional map to produce a contrast-normalized feature map that is input to the coarse estimator engine.

In Example 10, the subject matter of Examples 1-9 includes, wherein the coarse estimator engine includes a trained decision tree cascaded with a trained neural network.

In Example 11, the subject matter of Example 10 includes, wherein the coarse estimator engine includes a plurality of computation paths, each computation path corresponding to a detectable pattern, wherein each computation path includes a decision tree trained to detect the corresponding pattern, cascaded with a neural network trained to detect the corresponding pattern.

In Example 12, the subject matter of Examples 10-11 includes, wherein the neural network includes a set of output nodes trained to produce localization information of the corresponding detection pattern.

In Example 13, the subject matter of Examples 11-12 includes, wherein the localization information includes location, horizontal vector, and vertical vector information.

In Example 14, the subject matter of Examples 1-13 includes, a validation and fine estimator engine having a first input coupled to an output of the coarse estimator engine, and a second input coupled to the input operative to receive the captured image frame, wherein the validation and fine estimator engine further includes: a neural network trained to extract a portion of the captured image frame received via the second input that corresponds to the optical pattern based on the first input, and to determine whether that portion corresponds to a known pattern type.

Example 15 is a method for operating an optical symbol detector, comprising: receiving a captured image frame; autonomously computationally producing a downscaled descriptor map based on the captured image frame, the descriptor map including a convolutional map of blocks of the captured image frame; and autonomously computationally producing a detection indication and localization information of an optical pattern indicative of a machine-readable symbol based on the downscaled descriptor map; wherein producing a downscaled descriptor map includes: partitioning the image frame into blocks; and for each block: computing a downscaled descriptor based on an S-transform operation to produce a vector representative of that block; and computing a convolutional descriptor based on the vector of the block convolved with a kernel that includes, vectors of neighboring blocks; wherein the downscaled descriptor map comprises a set of convolutional descriptors of the blocks.

In Example 16, the subject matter of Example 15 includes, wherein in producing the downscaled descriptor map, the blocks are non-overlapping and square.

In Example 17, the subject matter of Examples 15-16 includes, wherein in computing the convolutional descriptor, for each block, the kernel includes vectors representing neighboring blocks along each side of that block.

In Example 18, the subject matter of Examples 15-17 includes, wherein producing the downscaled descriptor map further includes performing contrast normalization of the convolutional map to produce a contrast-normalized feature map.

In Example 19, the subject matter of Examples 15-18 includes, wherein producing a detection indication and localization information of the optical pattern includes processing a plurality of computation paths, each computation path corresponding to a detectable pattern, wherein each computation path includes a decision tree trained to detect the corresponding pattern, cascaded with a neural network trained to detect the corresponding pattern.

In Example 20, the subject matter of Examples 15-19 includes, extracting a portion of the captured image frame that corresponds to the optical pattern and determining whether that portion corresponds to a known pattern type.

Example 21 is at least one machine-readable medium including instructions that, when executed by processing circuitry, cause the processing circuitry to perform operations to implement of any of Examples 15-20.

Example 22 is an apparatus comprising means to implement of any of Examples 15-20.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An optical symbol detector, comprising:
   an input operative to receive a captured image frame;
   a feature extractor engine coupled to the input to produce a downscaled descriptor map based on the captured image frame, the downscaled descriptor map including a convolutional map of blocks of the captured image frame; and
   a coarse estimator engine coupled to an output of the feature extractor engine to produce a detection indication and localization information of an optical pattern indicative of a machine-readable symbol based on the downscaled descriptor map, wherein the coarse estimator engine includes a trained decision tree cascaded with a trained neural network.

2. The optical symbol detector of claim 1, wherein the feature extractor engine is operative to:
   partition the image frame into blocks; and
   for each block:
      compute a downscaled descriptor based on an S-transform operation to produce a vector representative of that block; and
      compute a convolutional descriptor based on the vector of the block convolved with a kernel that includes vectors of neighboring blocks;
   wherein the downscaled descriptor map comprises a set of convolutional descriptors of the blocks.

3. The optical symbol detector of claim 2, wherein the blocks are non-overlapping.

4. The optical symbol detector of claim 2, wherein the blocks are square.

5. The optical symbol detector of claim 2, wherein the blocks are 8×8 pixels.

6. The optical symbol detector of claim 2, wherein in the computation of the convolutional descriptor, for each block, the kernel includes vectors representing neighboring blocks along each side of that block.

7. The optical symbol detector of claim 6, wherein the kernel is 3×3 blocks.

8. The optical symbol detector of claim 1, wherein the feature extractor engine is arranged to computed multiple downscaled descriptors of the descriptor map in parallel and independently of one another.

9. The optical symbol detector of claim 1, wherein the feature extractor engine is further operative to perform contrast normalization of the convolutional map to produce a contrast-normalized feature map that is input to the coarse estimator engine.

10. The optical symbol detector of claim 1, wherein the coarse estimator engine includes a plurality of computation paths, each computation path corresponding to a detectable pattern, wherein each computation path includes a decision tree trained to detect the corresponding pattern, cascaded with a neural network trained to detect the corresponding pattern.

11. The optical symbol detector of claim 10, wherein the localization information includes location, horizontal vector, and vertical vector information.

12. The optical symbol detector of claim 1, wherein the trained neural network includes a set of output nodes trained to produce localization information of the corresponding detection pattern.

13. The optical symbol detector of claim 1, further comprising:
   a validation and fine estimator engine having a first input coupled to an output of the coarse estimator engine, and a second input coupled to the input operative to receive the captured image frame, wherein the validation and fine estimator engine further includes:
      a neural network trained to extract a portion of the captured image frame received via the second input that corresponds to the optical pattern based on the first input, and to determine whether that portion corresponds to a known pattern type.

14. A method for operating an optical symbol detector, comprising:

receiving a captured image frame;

autonomously computationally producing a downscaled descriptor map based on the captured image frame, the downscaled descriptor map including a convolutional map of blocks of the captured image frame; and autonomously computationally producing a detection indication and localization information of an optical pattern indicative of a machine-readable symbol based on the downscaled descriptor map;

wherein producing the downscaled descriptor map includes:

partitioning the image frame into blocks; and for each block:

computing a downscaled descriptor based on an S-transform operation to produce a vector representative of that block; and computing a convolutional descriptor based on the vector of the block convolved with a kernel that includes vectors of neighboring blocks;

wherein the downscaled descriptor map comprises a set of convolutional descriptors of the blocks.

15. The method of claim 14, wherein in producing the downscaled descriptor map, the blocks are non-overlapping and square.

16. The method of claim 14, wherein in computing the convolutional descriptor, for each block, the kernel includes vectors representing neighboring blocks along each side of that block.

17. The method of claim 14, wherein producing the downscaled descriptor map further includes performing contrast normalization of the convolutional map to produce a contrast-normalized feature map.

18. The method of claim 14, wherein producing the detection indication and localization information of the optical pattern includes processing a plurality of computation paths, each computation path corresponding to a detectable pattern, wherein each computation path includes a decision tree trained to detect the corresponding pattern, cascaded with a neural network trained to detect the corresponding pattern.

19. The method of claim 14, further comprising:

extracting a portion of the captured image frame that corresponds to the optical pattern and determining whether that portion corresponds to a known pattern type.

* * * * *